US007599907B2

(12) United States Patent
Havewala et al.

(10) Patent No.: US 7,599,907 B2
(45) Date of Patent: Oct. 6, 2009

(54) METHOD AND SYSTEM APPLYING POLICY ON SCREENED FILES

(75) Inventors: Sarosh Cyrus Havewala, Redmond, WA (US); Neal R. Christiansen, Bellevue, WA (US); Ran Kalach, Bellevue, WA (US); Ravinder S. Thind, Kirkland, WA (US); Jeremiah J. Moon, Glenview, IL (US)

(73) Assignee: Microsoft Corporation, Redmond, WA (US)

( * ) Notice: Subject to any disclaimer, the term of this patent is extended or adjusted under 35 U.S.C. 154(b) by 814 days.

(21) Appl. No.: 10/999,537

(22) Filed: Nov. 30, 2004

(65) Prior Publication Data

US 2006/0117063 A1    Jun. 1, 2006

(51) Int. Cl.
*G06F 7/00* (2006.01)

(52) U.S. Cl. .................... 707/2; 707/1; 707/100; 707/200

(58) Field of Classification Search ........... None
See application file for complete search history.

(56) References Cited

U.S. PATENT DOCUMENTS

| 7,188,127 B2* | 3/2007 | Stakutis et al. ............. 707/204 |
| 2003/0009484 A1* | 1/2003 | Hamanaka et al. .......... 707/200 |

* cited by examiner

*Primary Examiner*—Hung Q Pham
(74) *Attorney, Agent, or Firm*—Merchant & Gould PC

(57) ABSTRACT

Described is a mechanism comprising a data screening filter and user mode service that applies (enforces) policies regarding allowing or blocking file content of a directory, based on matching the filename against patterns associated with that directory. An administrator configures a screening policy, such as the types of files to allow in a particular directory and the types of files to block. File groups of member patterns and non-member exclusion patterns are defined and selectively collected in directory screening objects (DSOs). A directory screening object (DSO) is associated with a directory. When an I/O create request specifying a filename and a target directory is received, the filename is evaluated against the member/non-member patterns in the file groups referenced by the DSO for that directory to make for an allow or block policy decision. If not matched, DSOs on parent directories are evaluated upwards seeking a policy decision.

15 Claims, 7 Drawing Sheets

Set of Possible Members in File Group (e.g., *.mp*)

Sets of Possible non-Members in File Group (e.g., *.mpp, *.mpv)

Set of Possible Files in Namespace (*.*)

METHOD AND SYSTEM APPLYING POLICY ON SCREENED FILES

FIELD OF THE INVENTION

The invention relates generally to computer systems, and more particularly to computer files and storage.

BACKGROUND

Computer system administrators want to control the content that is stored on the computer systems (e.g., individual user's managed computers and network server shares) for which they are responsible. There are many reasons for needing control, including blocking certain types of files from being saved, preventing wasted space, organizing files on particular storage volumes for convenience and possibly security, and in general just knowing what is and what is not present on a file system volume.

For example, an enterprise may not want its employees to store large video files on shares on an enterprise server, as this consumes space. Similarly, an enterprise may also want to prevent storage of content such as music files that potentially make the enterprise liable for copyright infringement.

An enterprise or group therein may want only certain types of files on a network share, such as shared files used in day-to-day work operations. With respect to knowing what is on a storage volume, an administrator may want to know when certain files are added to the storage volume, such as to know when a user has installed (or even attempted to install) an executable program on a managed computer that is supposed to have a carefully-controlled set of executables.

At present, there is no known way to control content storage in such various ways, other than by manually inspecting file storage, or applying a utility program to do so, sometime after those files have already been stored and possibly used. While a utility could scan the file system and remove files deemed undesirable or move files where they do belong, doing so is time-consuming as well as after the fact. Such post-storage approaches also would lead to situations in which incorrectly named files or files inadvertently stored on the wrong file share suddenly disappear without the user knowing what happened.

What is needed is a mechanism for administrators to control the content on computer systems and storage volumes according to a policy, in which the policy may be applied in conjunction with the initial request to create a file (including copying the file from elsewhere) or rename a file on a storage volume. Such a mechanism should be sufficiently flexible for administrators to handle the many possible situations that may arise in a given computing environment.

SUMMARY OF THE INVENTION

Briefly, the present invention is directed towards a system and method by which the I/O requests issued by programs are screened to determine whether to allow certain file system-related operations (e.g., file creates) with respect to individual directories in a directory hierarchy. For example, based on a relationship between a filename provided with a create request and pre-established pattern data, certain files or types of files trigger policy, which may include blocking that file from being created (or renamed to a blocked name) on the target directory for which file creation has been requested. Instead of or in addition to blocking, additional policy such as writing an audit log record, or sending an e-mail, may be applied.

In one implementation, the administrator uses file groups containing pattern data (sets of file namespace patterns which may include wildcards) arranged into member patterns and/or non-member patterns (a list of exceptions to member patterns). A file group is a logical classification of files based on certain properties, such as the name and extension of the file. For a given filename, membership of a file in a file group is determined by establishing whether the filename matches any of the non-member patterns; if so then the file is not a member of the group. If not, the filename is evaluated to determine whether it matches any of the member patterns; if so, then the file is a member of the group. If there is not a match with the non-member patterns or member patterns, the file is not a member of the group. Thus, the non-member list takes precedence over the member list, enabling an administrator to grant file group membership to certain categories of files yet specify exceptions to membership via the non-member patterns list.

Via pattern data arranged within file groups, an administrator applies policy to a directory based on whether a given file is a member of a file group or set of file groups. To tie the pattern data to a directory, a data screen object is used as an association unit, in which the data screen object contains lists of one or more file groups to associate with a directory, and thereby defines the screening policy on a directory.

A Data Screen Object is defined by a list of zero or more "allow" file groups, and a list of zero or more "block" file groups. When a create request is received, the screening decision for a file with respect to the target directory is determined by establishing whether the file (based on the filename) is a member of any of the "allow" file groups listed in the data screen object on the directory; if so, a first policy is applied, which is typically NULL policy, wherein the requested operation is not considered a violation and the request is allowed to proceed.

If the file is a member of any of the "block" file groups of the data screen object on the directory, a second policy is applied, typically corresponding to a violation. Thus, on the same directory, allow takes precedence over block, so that a data screen object enables the administrator to block certain types of files in the directory, with the allow overriding the blocking action for certain groups of files.

If neither a member of an allow file group or a block file group, the parent of the directory is checked for a data screen object to look for policy to apply. If no policy is found, the mechanism walks up the tree to the next parent directory and so forth, looking for a data screen object that has an allow or block match, until a policy is applied or there is no parent. If no parent, the allow policy (typically no action, thereby allowing the request to proceed) is applied. Thus, screening policies on sub-directories take precedence over parent directories in an upward direction, whereby an administrator set a screening policy on a directory and also set one on a subdirectory to exclude the sub-directory from some screening policy effective on its parent. The screening for a subdirectory may be more restrictive.

In one implementation, the screening mechanism comprises a kernel mode data screen filter and a user-mode storage resource management service. As computer programs (e.g., user mode programs and kernel mode components above the data screen filter) make file system-directed create requests via API calls, corresponding I/O requests reach the data screen filter. The data screen filter then processes the request using data screen objects with their references to file groups as described above to match filenames against patterns for the directory, and if necessary for parent directories, until a policy application is determined. In this manner, file creates and other file I/O requests can be blocked by policy before occurring, providing dynamic screening for content on a per-directory basis.

Other advantages will become apparent from the following detailed description when taken in conjunction with the drawings, in which:

DETAILED DESCRIPTION

Exemplary Operating Environment

Figure 1:
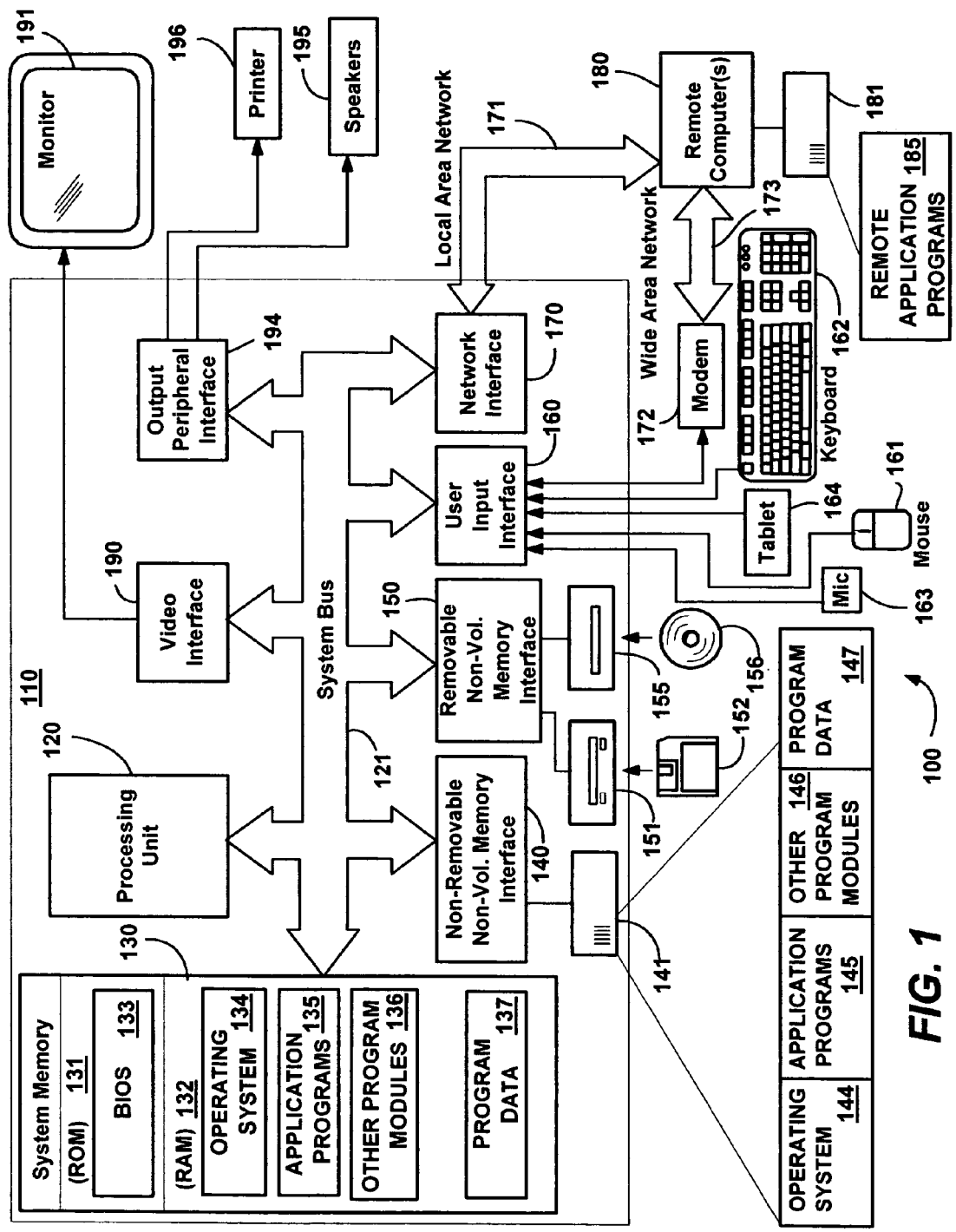
FIG. 1 is a block diagram generally representing a computing environment into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, described above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a tablet, or electronic digitizer, 164, a microphone 163, a keyboard 162 and pointing device 161, commonly referred to as mouse, trackball or touch pad. Other input devices not shown in FIG. 1 may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Data Screening

The present invention is generally directed towards a system and method by which the I/O requests issued by computer programs are screened to determine whether to allow certain file system-related operations (e.g., file creates) with respect to individual directories in a directory hierarchy. For example, based on a relationship between a filename provided in association with the create request and pre-established pattern data, certain files or types of files trigger policy, which may include blocking that file from being created (or renamed to a blocked name) on the target directory for which file creation has been requested. As will be understood, this is accomplished by code that analyzes each such request dynamically, as it occurs, so that among other things, if policy is to block a certain file's creation, the blocked file is never created, even temporarily, and the user can know immediately that the file was not successfully created, as well as the reason.

Thus, the present invention is primarily directed towards evaluating a file system operation (e.g., a file create) to determine whether based on the full path information associated with the file system request, (e.g., volume, directory path and filename or UNC path), policy is applied (e.g., blocking creation of that file in the directory on which creation is requested). However, as will be understood, the present invention is not limited to blocking file creation or renames, but can apply other policy in addition to blocking or instead of blocking. For example, the creation may be allowed to occur, but as determined by policy, some other action may be taken, e.g., the create event may be logged such as to an audit file, a message may be sent (e.g., to the system administrator), and so forth. Policy that blocks file creation also may cause additional policy to be applied. Further, the present invention is not limited to applying policy only on create or rename requests, but can apply policy on other types of file system requests; different policies may apply to different types of requests, and different policies may apply depending on the evaluation result. Thus, although the examples herein are primarily directed towards applying policy or not with respect to file creation/renaming request based on evaluation of a filename and the directory information accompanying the request, it is understood that these are only examples.

As will be also understood, numerous ways to implement the present invention are feasible, and only some of the alternatives are described herein. For example, the present invention is primarily described below with reference to I/O request packets (IRPs) that pass through a set of filter drivers, in which the IRP passing may be controlled by a filter manager via pre-callbacks and post-callbacks. However, the present invention may alternatively be implemented in an arrangement in which the passing may be through a stack of filter drivers, sequentially from one filter driver to the next, and/or in the file system itself. Moreover, the program having its I/Os evaluated may be writing to one or more local file system volumes and/or to one or more network servers, and each may have different directory structures and associated policy-related data. Notwithstanding, other types of filter driver arrangements, I/O passing and/or storage options are feasible. For example, the present invention may be configured to work in an architecture where requests are not passed as IRPs, but in some other format. As such, the present invention is not limited to any particular examples used herein, but rather may be used various ways that provide benefits and advantages in computing in general.

In order to configure the I/O subsystem to determine what policy, if any, should be applied, the administrator needs a way to distinguish various types of filenames from one another. Although the administrator could individually list each filename for which policy would be applied, this would be time-consuming and highly inefficient, as frequently it is types of files, as denoted by their file extension, to which an administrator wants policy applied. To this end, a data screen pattern, or simply a pattern for short, defines a set of filenames (pattern data) that can be compared against a requested filename. In one implementation, pattern data may include filenames specified in the form of a wildcard (such as "*" or "?"), e.g., *.exe will identify any file with an .exe extension, the well-known extension for executable files. Note that *.ex? is a pattern which *.exe executable files match, as do files of type *.exa, *.exb, *.ex2 and the like, essentially representing a three-character filename extension that substitutes any third alphanumeric character (or other suitable character) that is a valid character for filenames for the "?" wildcard.

Although the availability to use wildcards in pattern data is efficient, wildcards are not required in the present invention, as other alternatives including individual filename listings and/or ranges of files/extensions (such as file extensions mp0 through mp9 inclusive) may be used to specify files. Notwithstanding, wildcards are described herein as one suitable mechanism for identifying files, because of their efficiency in allowing administrators to identify entire types of files at once, and because the usage and handling of wildcards is a well established and understood part of file system technology. Further, wildcard use is optional in that even with wildcard availability, an entire filename and/or extension without wildcards may be used instead, meaning that listing individual files is still an option. Note that while the present invention is primarily described with reference to file types as recognized by their extensions, any suitable part or all of a filename may correspond to a pattern. Thus, with wildcards, several thousand files that range from a2.text to a999999.txt may be simply represented in pattern data by a*.txt, demonstrating another advantage of wildcards.

Because wildcards can encompass more files and file type than desired, one implementation uses the concept of maintaining various sets of pattern data in file groups, wherein a file group is a logical classification of files based on certain properties, e.g., the name and extension of the file. Each file group contains a list of zero or more member patterns corresponding to filenames to include as part of the group, and/or a list a zero or more non-members patterns, comprising a list of exceptions to the member patterns. As described below, non-members override and thus exclude filenames that may be otherwise identified by a pattern in the member group.

By way of example, consider a file group of music-type files defined by member pattern(s) of *.mp* and non-member patterns of *.mpp and *.mpv. Any music files, such as one named mysong.mp3, is considered a member of the group, whereas a project file named myproject.mpp is considered a non-member, as would any files that do not match the member pattern at all, e.g., myspreadsh.xls. This result occurs because the default is that a file is a non-member unless listed as a member, with an exception non-member list that takes precedence over the member list. This allows an administrator to grant file group membership to one or more certain categories of files, and then specify exceptions to membership granted by the member patterns list, with completely unrelated files (of course) not being considered as members. Note that it is essentially equivalent, although somewhat less intuitive, to do this in reverse, e.g., start with every file being a member unless specified as a non-member, and then specify exceptions that make files members within the non-member set.

Figure 2:
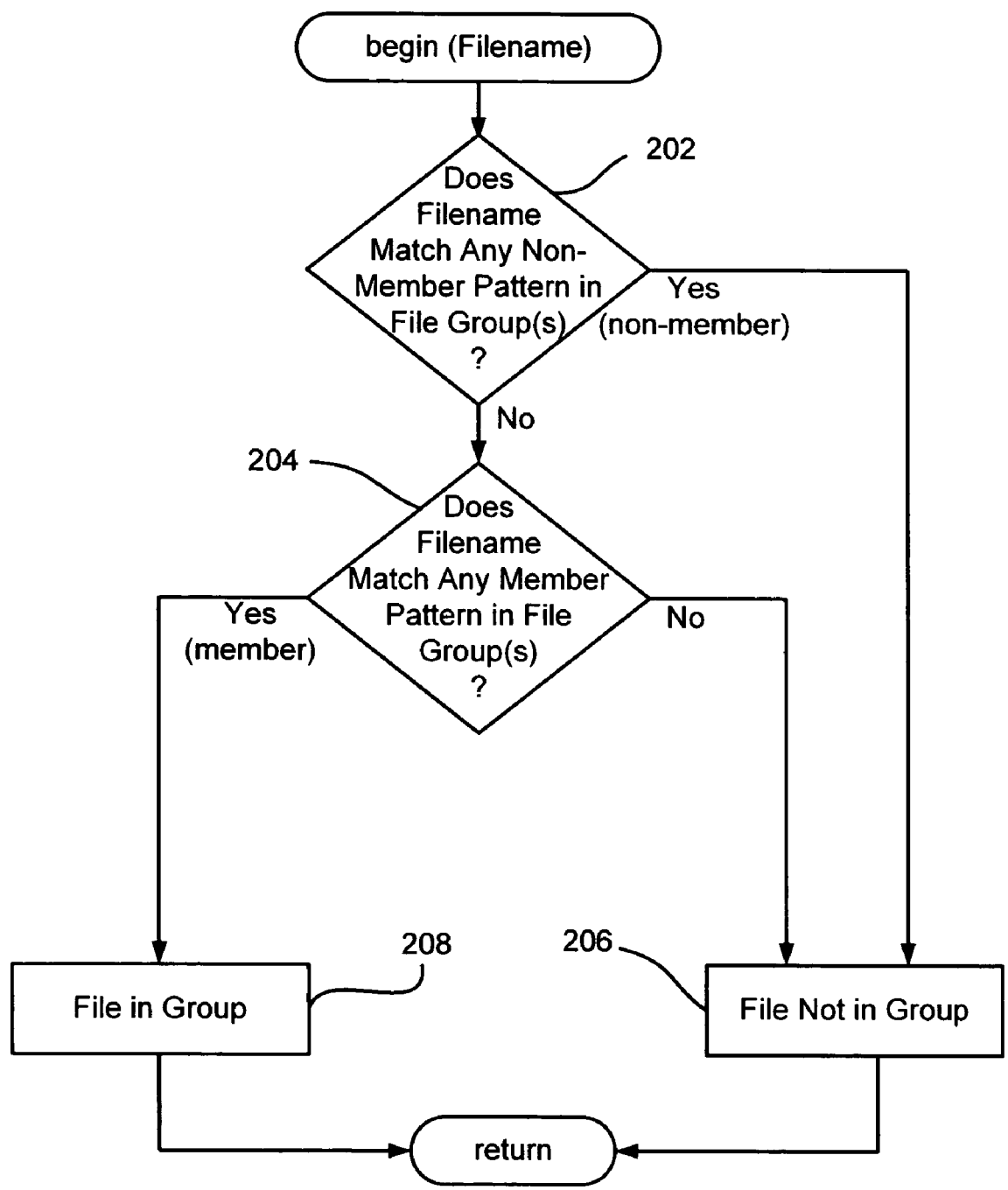
FIG. 2 is a flow diagram generally representing logic for determining whether a given filename is a member or non-member of a file group, in accordance with various aspects of the present invention.

FIG. 2 shows example logic for determining whether a given filename is within a given file group or set of file groups. As can be seen, step 202 first looks for non-member exclusions. If the filename fits into any non-member pattern, (there may be from zero to any practical number of non-member patterns), the file is excluded from that group, and an indication provided (e.g., FALSE) as appropriate via step 206. Note that the exclusion is immediate, regardless of whether any non-member patterns remain to be evaluated and regardless of the member patterns, because matching any one non-member pattern is sufficient to exclude the file from the file group, and exclusions override inclusions in a member group.

Returning to step 204, if no match is found using the non-member patterns (including if there are zero non-member patterns), step 202 instead branches to step 204, where an evaluation of the filename is performed against the member patterns in the file group or set of file groups. If the filename fits into any member pattern, (there may be from zero to any practical number of member patterns), the file is immediately considered to be a member of that group regardless of whether any member patterns remain to be evaluated, (since the file group is essentially a union of patterns), and an indication (e.g., TRUE) provided as appropriate via step 204.

If step 204 cannot locate a matching member pattern, (which includes when the member set is a NULL set), the file is not in the group, and thus step 204 branches to step 206 where a "not-in-group" indication is provided (e.g., FALSE) as appropriate.

The patterns in a file group or set of file groups may be arranged in any order, such as sorted for efficiency, e.g., patterns believed (or measured in some way) to correspond to more common types of filenames may be arranged to be evaluated first. The file groups can also be ordered within the data screening object, such as for similar purposes. Note that file groups may be used for other applications that operate based on file classification.

Figure 3:
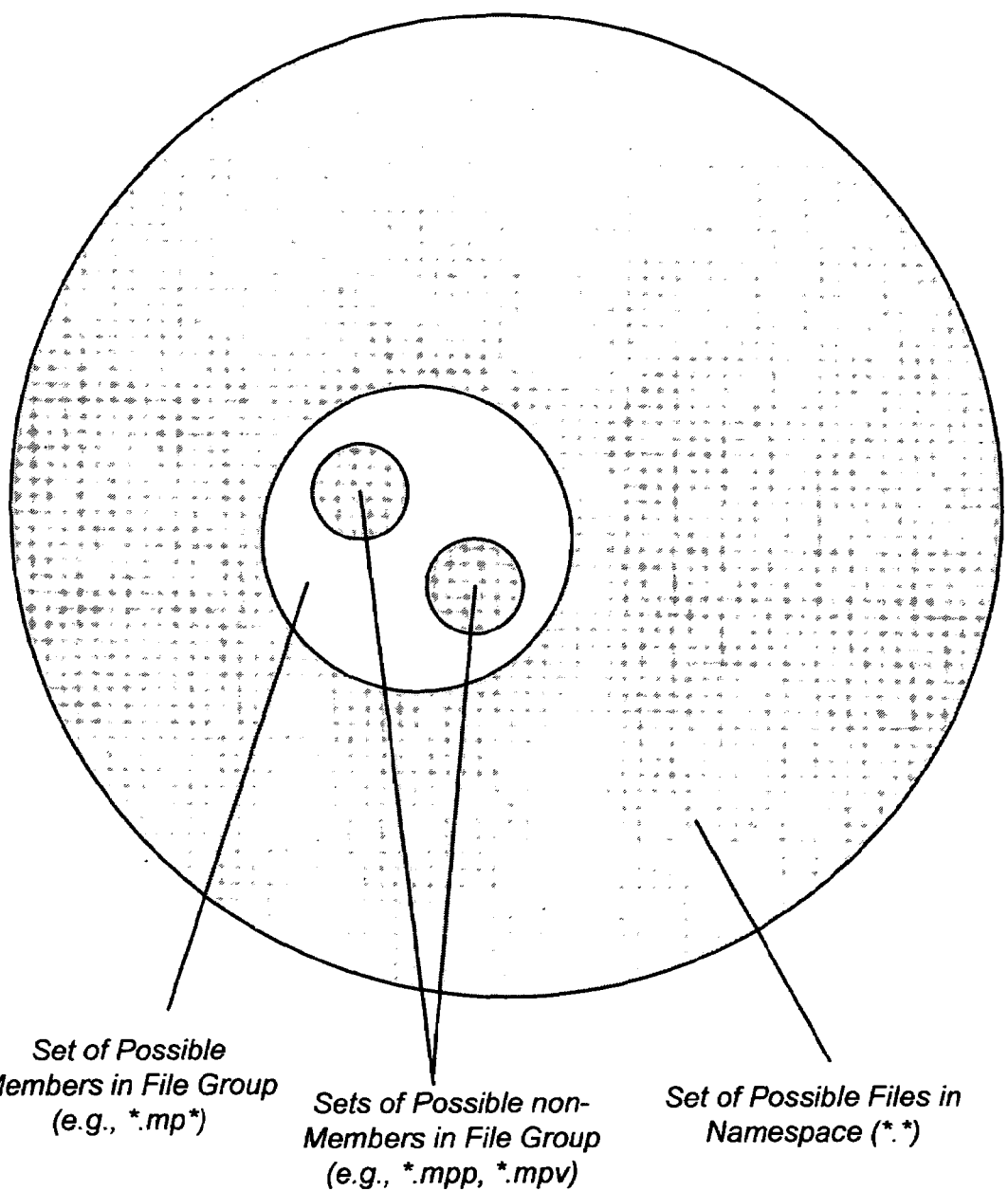
FIG. 3 is a representation for visualizing the concepts of a file group having a member set and a non-member set in a file system namespace, in accordance with various aspects of the present invention.

FIG. 3 is a representation (not to any scale) to help visualize via namespaces the members and non-members in a file group. In general, all files (*.*) are not members of a given file group unless listed in the file group. A file group, such as the music-related file group that had mp* as a pattern in its member list, defines a set of files within the possible file namespace. This is represented in FIG. 3 by the smaller non-shaded area (the member list namespace) within the large shaded area (the total possible namespace). Within the member area are the non-member exclusions, comprising the namespaces represented by the smaller shaded areas. As is readily apparent from FIG. 3, the only files that remain in the member file group namespace are those in the non-shaded area. As seen in FIG. 2, described above, if a file falls into the small shaded areas, it is immediately not in the group; if not within such an exception area, the file is then tested for whether it falls in the remaining non-shaded area; only if so is the file within the file group.

Via pattern data arranged within file groups, an administrator can now apply policy based on whether a given file is a member of a file group or set of file groups. To tie pattern data to a directory, a data screen object is used as an association unit, in which the data screen object contains lists of one or more file groups to associate with a directory, and thereby defines the screening policy on a directory. In one implementation, each directory may have only one data screen object (DSO), but in alternative implementations, a directory may have multiple data screen objects, which may all apply or selectively apply, e.g., possibly different ones for different categories of users/usergroups, different ones for different types of evaluations (e.g., a file create request has one and a file read request has another) and so on. For purposes of simplicity, an implementation having only one data screen object per directory will be described herein.

As described below, a data screen object is defined by a list of zero or more "allow" file groups and a list of zero or more "block" file groups. Note that the terms "block" and "allow" comes from the likelihood that the most typical policy decision will be to block or allow file creation, although as described below actual blocking of a file create is not required when applying "blocking" policy.

In addition to the file group information, it is also feasible to put different policy information in each data screen object and thereby have differing policies apply to different directories depending on its associated data screen object, however for purposes of simplicity, the policy will be the same for all directories. Further, note that it is feasible to have the data screening objects be set up with the member and non-member pattern lists directly, rather than indirectly via references to the file groups that contain those lists, however the use of file groups provides administrators with flexibility and ease of use, as well as the include with exclude override. Note that after setup, when needed in actual operation, the data screen object in-memory structure may indeed contain the (e.g., unioned) member and non-member pattern lists directly, preprocessed into the block and allow lists, rather than containing references to file groups, such as for purposes of efficiency. For purposes of explanation herein, the present invention will be described with data screen objects that contain reference(s) to file group(s).

Figure 4:
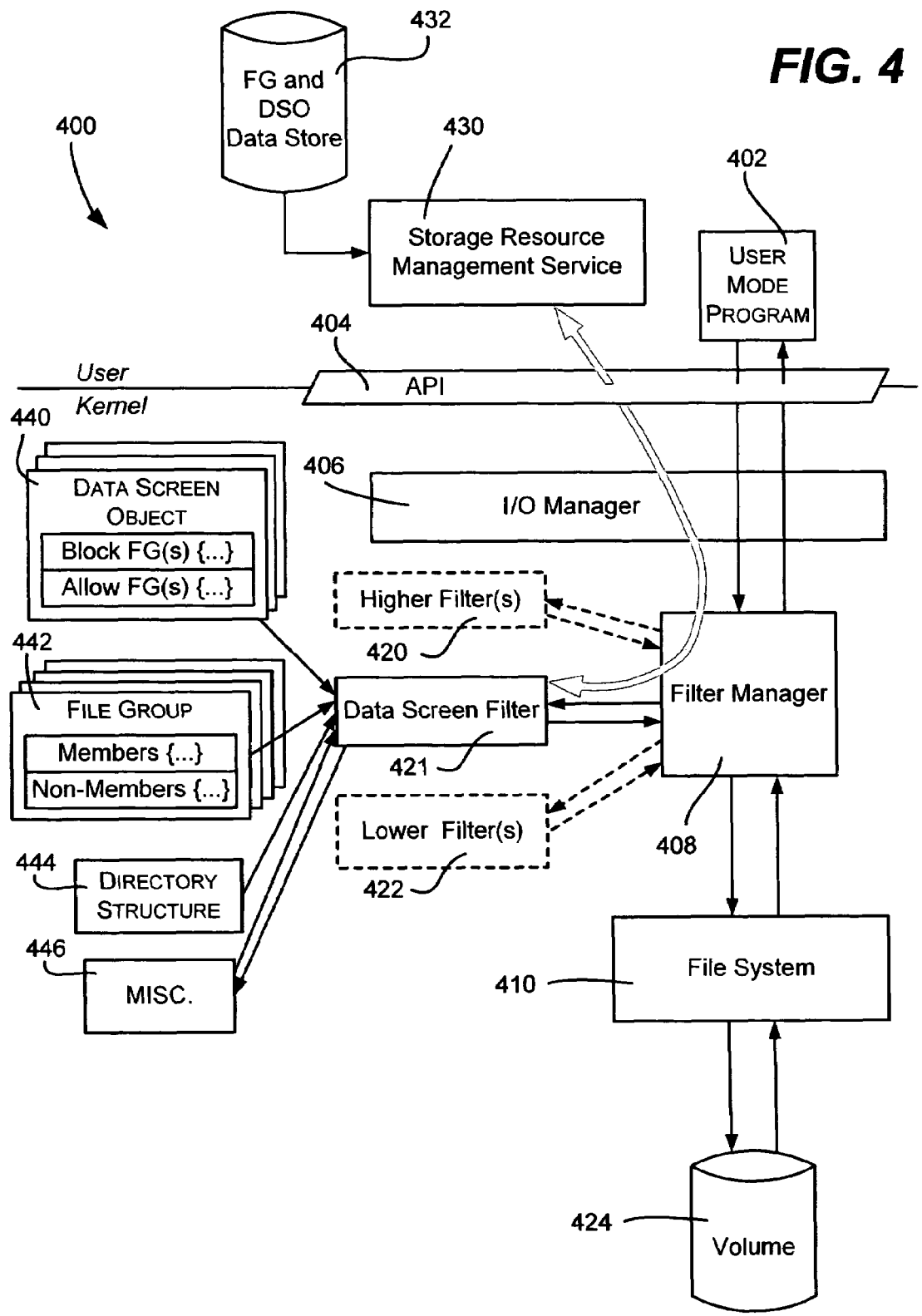
FIG. 4 is a block diagram including a filter manager architecture and components for applying per-directory policy based on a filename versus pattern data, in accordance with various aspects of the present invention.

In operation, the data screen objects and file groups are used to determine whether to apply policy when a relevant file-system related request is received, such as a request to create a given file on a given directory. As is known, such a request contains information (e.g., a full path) from which the desired directory and desired file are identifiable. FIG. 4 shows an architecture in which a filter driver evaluates such a request in accordance with various aspects of the present invention. In general, a filter driver (or simply "filter") is software code that is able to inspect and possibly modify data sent to or received from a file system. For example, an antivirus filter driver may look for virus signatures, a quota filter driver may watch a user's disk space consumption, an encryption filter driver may encrypt data on its way to the file system and decrypt it on the way back, and so forth.

As represented in FIG. 4, one exemplary arrangement 400 of components of a system is provided into which the present invention may be incorporated via a filter driver. The components include one or more user-mode (e.g., application or shell) programs 402, a set of application programming interfaces (APIs) 404, an input/output (I/O) manager 406, a filter manger 408, a file system 410, storage volume 412, and filters 420-422. As is generally known with filter drivers, there may be any number (including zero) of higher-level filters 420 and/or lower-level filters 422 installed relative to another driver in any given implementation. Note that the present invention may work with multiple file systems and/or multiple storage volumes, as long as the directory structure and data screening object associations are known for each volume, however for purpose of simplicity, FIG. 4 shows one file system 410 and one storage volume 424, which may be local or remote.

In accordance with an aspect of the present invention, two components shown in FIG. 4 are directed towards evaluating file system create requests received as I/Os to determine whether policy is to be applied to those requests. These components include a user-mode storage resource management service 430 and one of the filter drivers, namely the data screen filter 421. For various purposes described below, the user-mode storage resource management service 430 has an associated data store 432 containing file group (FG) information and data screen object (DSO) information, (although the data screen filter 421 may persist this information instead). A user interface (not shown) or the like allows administrators to maintain the data store 432 as necessary.

As will be understood, the separation of the data screen filter 421 and storage resource management service 430 is for convenience and efficiency in this architecture, and the division in structure and/or functionality between them is somewhat arbitrary except that in general, kernel-mode components are generally written to be highly efficient and as straightforward as possible to avoid potential errors. Thus, although it is understood that essentially all of the present invention's screening operations may be implemented in the filter driver component 421, having some of the work performed in the user-mode component 430 provides certain advantages and benefits, and thus is used in environments where some communication channel exists between the user-mode component 430 and the kernel-mode component 421. Notwithstanding, it is feasible to implement a filter driver that is installed and configured, such as following system boot or on demand, that obtains the data needed to screen I/Os and apply policy until halted in some manner.

User-mode computer programs 402 often make file system-directed create requests via API calls through the API set 404 to the I/O manager 406, such as when creating a new file or copying or moving an existing file from another storage location. In general, the I/O manager 406 may determine what I/O request or requests should be issued to fulfill each program request, and sends the corresponding request or requests to the filter manager 408. In the example implementation described herein, the I/O manager sends requests in the form of an I/O request packet, or IRP. The I/O manager 404 also returns status codes and/or data to the user-mode programs 402 in response to the API calls. Note that kernel mode components can also make file-system directed I/O requests, and thus the data screen filter 421 may receive IRPs initiated by kernel mode components that are above the data screen filter, as well as receive IRPs corresponding to file-system directed requests initiated by user-mode programs.

In one implementation, described in U.S. patent application Ser. No. 10/315,384, filter drivers may register (e.g., during an initialization procedure) with a registration mechanism with the filter manager 408. For efficiency, each filter driver typically will only register for file system requests in which it may be interested in processing. To this end, as part of registration, each filter driver notifies the filter manager 408 of the types of I/O requests in which it is interested (e.g., create, read, write, close, rename, and so forth). For example, an encryption filter driver may register for read and write I/Os, but not for others wherein data does not need to be encrypted or decrypted. Similarly, a quota filter driver may be interested only in object creates and object writes.

In the current example described herein in which the filter driver 421 wants to screen newly created or renamed files, the data screening filter driver registers for any I/O request that creates or renames a file on a directory. Note that the opening of an existing file may cause policy to be applied, however if the policy blocked the opening of the file, in one implementation the file could not be deleted if the open was blocked because an open is necessary to delete the file, and thus opens are not blocked. Notwithstanding, with the present invention, policy may be applied per directory for files with respect to any type of file system-directed request, including opens, reads, writes, deletes, closes and so forth.

In addition to specifying the types of I/O requests in which it is interested, a filter driver may further specify whether the filter driver should be notified for pre-callbacks and post callbacks for each of the types of I/O. A pre-callback is called as data associated with an I/O request propagates from the I/O manager 406 towards the file system 410, while a post-callback is called during the completion of the I/O request as data associated with the I/O request propagates from the file system 410 towards the I/O manager 406. During pre-callback, a filter driver can opt out of receiving a post-callback for a particular IRP even if it is generally registered for those types of IRPs. In general, the filter manager 408 receives IRPs from the I/O manager 406 and sequentially passes data associated with that IRP to each filter driver registered for that type of request, in an order that generally depends on whether and how the filter driver modifies the data or not, e.g., an antivirus filter driver should come before an encryption filter driver for data on its way to the file system so that the antivirus filter driver can see the data in its unencrypted form.

As described below, for efficient operation, the filter driver 421 may store a needed amount of data in memory so that it does not need to communicate with user mode code to retrieve regularly-needed data. In one implementation, the data maintained by the filter driver is primarily provided to it by the user-mode storage resource management service 430. To this end, the user-mode storage resource management service 430 and the corresponding filter driver 421 have a communication channel, e.g., the filter manager 408 recognizes and appropriately routes such communications, which are thus essentially private. This communication channel is represented in FIG. 4 by the relatively-wide gray arrow; note that this channel may be protected such that administrator-level privileges are required to communicate over it.

In the present example in which the filter driver 421 is evaluating create requests on a per-directory basis, the filter driver obtains the data screening objects 440 and file groups 442, as well as a representation (e.g., a set of nodes) of the current volume's directory structure 444, which also contains information indicating which directories are associated with which data screening objects; a given directory need not have any association. The data screen filter 421 then has knowledge of the data screen object for each directory (e.g., node) of the directory structure, and the data screen objects in turn tie the file groups to the directory, whereby that the filter 421 can begin its filtering operation. Miscellaneous working data 446 is also shown, such as for storing some policy-related data (e.g., actually block on a policy violation or not). In keeping with the present invention, with this information, the data screen filter 421 may evaluate file-system requests (such as create requests) against membership information, on a per-directory basis, and thereby produce a policy-related result.

Figure 5:
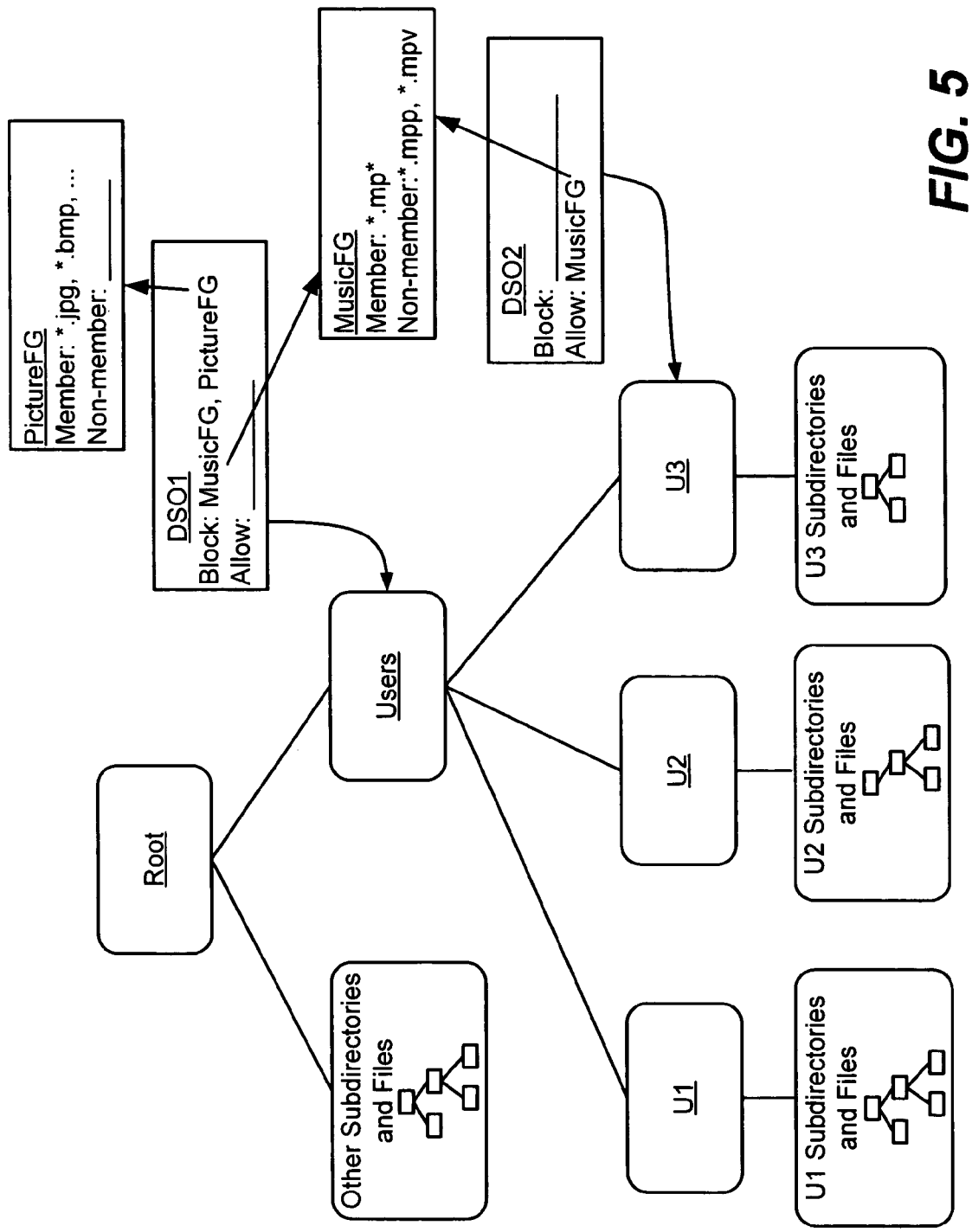
FIGS. 5 and 6 comprise representations of directory structures, each structure having directory nodes with associated data screen objects that relate to file group patterns that are used for determining whether to apply policy in accordance with various aspects of the present invention.
Figure 6:
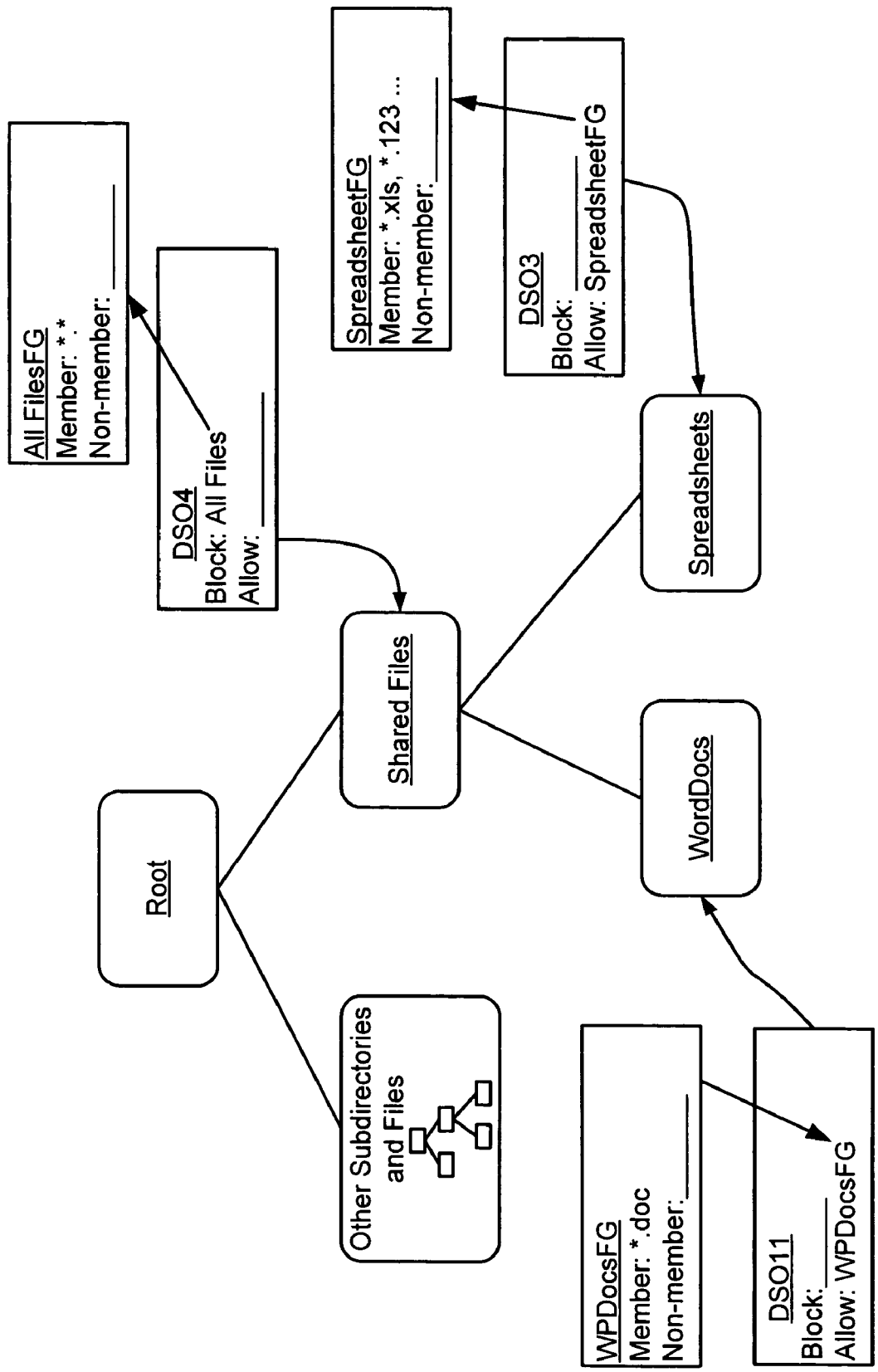

FIGS. 5 and 6 show example directory structures (for different volumes) with data screen objects associated with administrator-selected directories, wherein as described above, the data screen objects contain references to file groups that in turn contain the member and/or non-member patterns. Thus, in FIG. 5, it is seen that an administrator has set one data screen object DSO1 to be associated with a "Users" directory, and another data screen object DSO2 to be associated with a particular user directory, U3. Different data screen objects (e.g., DSO1 and DSO2) can both contain references to a common file group (e.g., MusicFG), and although not readily apparent from FIG. 5, an administrator can reuse data screen objects among different directories. In FIG. 6, it is seen that that an administrator has set a data screen object DSO4 to be associated with a "Shared Files" directory, another data screen object DSO3 to be associated with a particular directory, Spreadsheets, and another data screen object DSO11 to be associated with a particular directory, WordDocs. The evaluation of a filename using the data screen objects is described below with reference to FIG. 7.

Returning to FIG. 4, in a typical configuration, the filter driver 421 may be configured to block file creation on a particular directory for a given file, which it can do by stopping the I/O request (e.g., during the pre-callback phase), and may instruct the filter manager 408 to report a status code (e.g., failure) for the I/O request. As described below, the filter driver 421 will also notify the user-mode storage resource management service 430 anytime policy is deemed to apply, so that the user-mode storage resource management service 430 may apply the policy (or additional policy). The notification may include identification as to which data screening object, directory and/or filename caused the policy violation, so that the user mode service 430 has this knowledge. Note that for efficiency, rather than waiting for instructions from the user mode code 430, the data screen filter 421 may be instructed in advance whether to block file creation when a file is found to be a member of a blocked file group (as well as notify the storage resource management service 430), or allow the file creation and only notify. As described above, such policy data may be provided during initialization, and is typically for all directories but may be per directory if provided (e.g., within the directory structure 444), or per data screen object (e.g., if provided within the data screen object).

Figure 7:
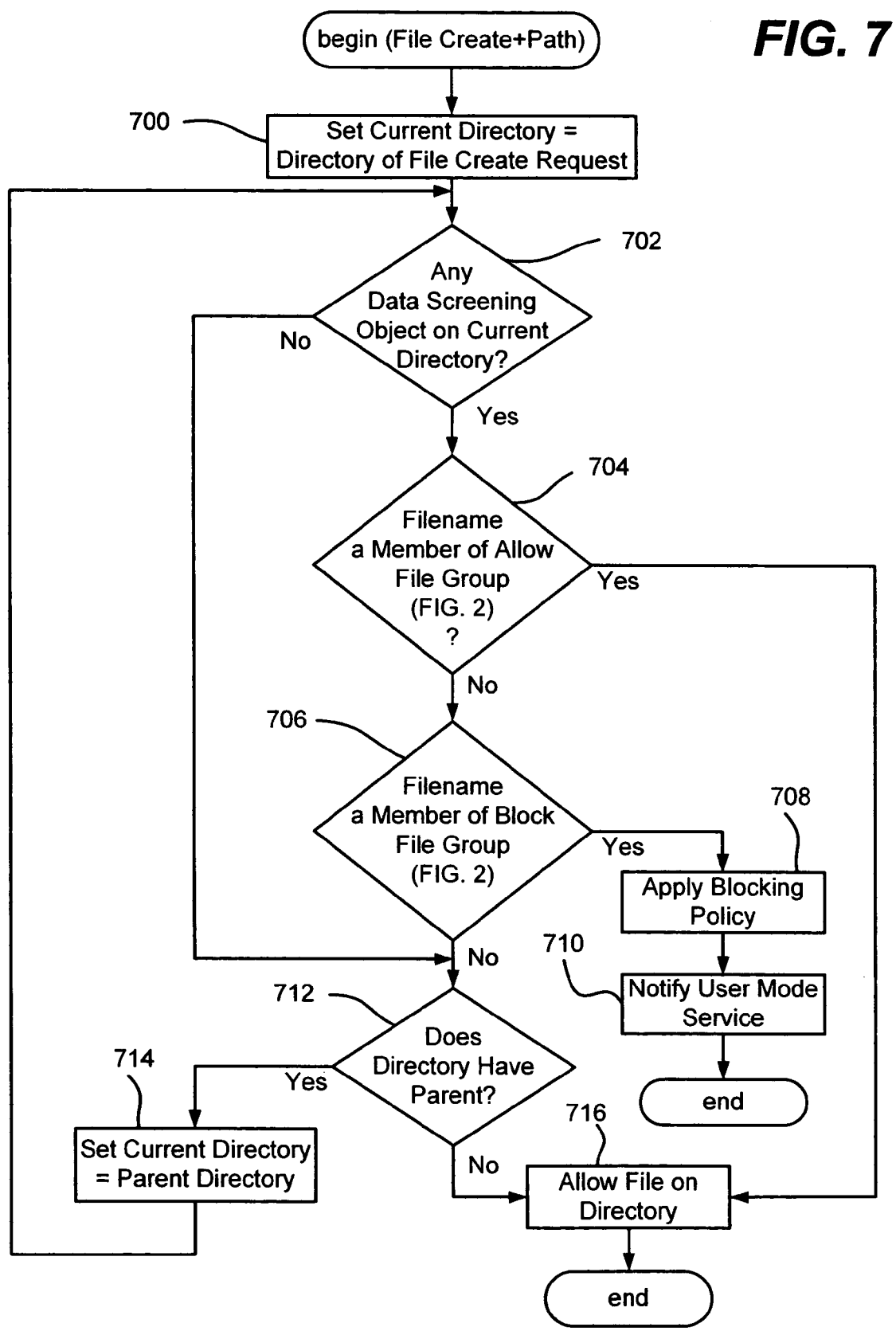
FIG. 7 is a flow diagram generally representing logic for handling a request to create a file on a directory by determining whether to apply policy, in accordance with various aspects of the present invention.

To determine whether to apply policy when a file create request is received (the full path is essentially identifiable via the request), FIG. 7 shows example logic used by the data screen filter 421, beginning at step 700 where the target directory in which the file create is being requested (typically but not necessarily a subdirectory in the directory tree) is located and set as the current directory.

Step 702 evaluates whether this current directory has a data screening object associated with it, e.g., found via the directory structure 444. If not, then this directory is not directly subject to policy, however it may inherit policy from a higher parent directory, and thus step 702 branches to step 712 to essentially walk up the directory tree until some policy is found that either allows the file or blocks the file, or the root is reached without any policy to apply.

If instead at step 702 there is a data screening object, then its file group or file groups need to be evaluated against the filename to determine whether policy is to be applied to this particular file. First, the allow file groups are tested, generally using the logic of FIG. 2 to determine if there is membership in an allow file group, because if specifically allowed by being a member of any allow file group(s) listed in the data screen object associated with the current directory, the requested operation is deemed to not be a violation of policy. In this event, step 704 branches to step 716 where the allow "policy" is applied, (in this example, there is no allow policy other than to do nothing, which is equivalent to a policy of NULL), whereby the file is allowed to be created on the target directory as originally requested. Note that in alternative implementations, there may be an allow policy that actually per-forms some action at step 716, whether in the driver or by a notification to the user mode service 420; for example, the file creation may be still conditional on some other policy, e.g., allow the create if the file size is less than 10 MB, otherwise block creation. Further, note that creation may be prevented for another reason, such as prevented in another driver or the file system, and thus "allow" as used in this context means allow the request to proceed further.

If instead at step 704 the file name is not a member of an allow group (or there are no allow groups, which essentially means the same thing), step 704 branches to step 706 to evaluate the filename against the "block" file group or groups listed in the data screen object. If at step 706 the file is a member of any block file group(s) of the data screen object for the current directory, the operation is a violation of policy, and step 706 branches to step 708 where any blocking policy that the driver 421 can apply is applied (e.g., the file create is blocked), followed by step 710 where the user mode service is notified of the policy violation.

In the event that the filename was not a member of either the allow file group(s) or block file group(s), then the parent directory, if the current directory is not already the root, needs to be evaluated. This is because policy screening decisions associated with a directory apply to that directory as well as any subdirectories, unless overridden by policy at the subdirectory. Steps 712 and 714 are repeated as necessary to walk up the tree towards the root looking for a data screening object that will result in a decision, until one is found or there is no parent because the current directory is already at the root directory.

As can be understood from FIG. 7, by starting at the target directory that the file request has specified and walking up as necessary, screening policies on lower directories take precedence over their parent directories. This allows an administrator to set a screening policy on a directory, and also set one on a subdirectory, while giving the subdirectory policy precedence. This is generally because a subdirectory is frequently a narrower subset of a parent, and thus may require an exception to a general rule for a parent. In other words, this semantic allows an administrator to exclude a subdirectory from some screening policy effective on its parent. It also allows the administrator to set up more restrictive screening on a subdirectory.

Moreover, by evaluating for an allow result before a block result on the same directory, membership in an allow file group takes precedence over membership in a block file group. This is because the default behavior in a directory is to allow all files, whereas a data screen object allows the administrator to block certain types of files in the directory. Thus "allow" may be used to override the blocking action for certain groups of files. Note that again, it would be largely equivalent to do this in reverse.

FIG. 5 shows how allowing and blocking works in an example directory. In FIG. 5, the administrator has essentially set up the directory and data screen objects so that music file group files and picture file group files are blocked from users, unless there is an exception set. This is accomplished by setting DSO1 up with two block file groups, one for music file membership (e.g., *.mp3) and one for picture file group membership (e.g., *.jpg or *.bmp). These lists have been kept small for purposes of this example, however other music files and picture files may be listed in a given group, and moreover, a larger file group may be defined that contains both pictures and music files in a single member list. Note that administrators may be provided with sets of data screen objects and/or file groups in advance for common types of issues, whereby an administrator need not start from scratch.

As can be seen by following the logic of FIG. 7 and FIG. 2, a file named X.mp3 will violate policy (e.g., be blocked) if an attempt is made to create the file in the U2 directory. This is because while the U2 directory does not have an associated data screen object, a higher parent (Users) does, and a *.mp3 file is a member of the music file group MusicFG, which is blocked by the block list in the directory screen object DSO1. However, X.mpp does not violate policy, because it is not a member of the music file group MusicFG due to the file extension listed as a non-member.

A different user, corresponding to the U3 directory, will get different results with respect to music files. For example consider a user that needs to work with music files as part of his or her job; in such a situation the administrator will make an exception. To this end, the administrator sets a data screen object DSO2 which has the music file group MusicFG on its allow list. Because directly allowed, X.mp3 will not have blocking policy applied. However, there is no such exception for pictures, and thus an attempt to create Y.jpg in the same directory will fail because of DSO1, which also lists the picture file group PictureFG in its block list. Thus, as can be seen from FIG. 5, administrators have the ability to easily apply policy to select file types (or even individual files) on a per directory basis based on file group memberships, with the policy applied down the directory tree; allow exceptions can be made as desired.

FIG. 6 shows another example way in which the highly-flexible mechanisms of the present invention produce a desirable result. In FIG. 6, the administrator wants to restrict a directory named Shared Files to having only certain types of files in directories under it, namely word processing files (*.doc) and spreadsheet files (*.xls, *.123 and possibly others not shown as indicated by the ellipsis). In this example, such files also need to be created in their respective directories.

To accomplish this, the administrator simply blocks all files on the Shared Files directory via the data screening object DSO4, and then makes exceptions for its subdirectories via DSO3 and DSO11, as should be readily apparent in FIG. 6. Because files are evaluated for policy violations walking up the tree, document file creation requests with the proper filename made to the proper corresponding directory do not violate policy, while all others do.

It should be noted that if only creation and renaming is prevented, pre-existing files will still exist and be opened on a directory. These can be allowed to stay or be cleaned up in some other manner.

Further, with the example implementation described herein, even the administrator is blocked from overriding the policy, unless the administrator removes the screening object or objects that apply the policy. However, in an alternative arrangement, different directory screening objects (or none instead of one) may be selected by the filter driver 421 based on the credentials of the requesting entity, whereby an administrator can have different rules for different users and groups, including the administrators group. To this end, the user information would be used to see if there was data screening object for that user at the current directory (at a modified step 702), and if so, to use the file groups of that particular per-user data screening object as needed at similar steps 702 and/or 704. Note that user information is already known to the filter driver stack via the IRP, (an indeed is used in other scenarios such as by per-user quota filter drivers).

As can be seen from the foregoing detailed description, there is provided a method and system that applies policy as specified for user mode I/O requests, such as to allow or block create file requests, based on a directory identity and a filename. The use of data screen objects and file groups makes it easy for administrators to apply policy to individual directories and thus control the content of storage volumes.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. At least one computer storage medium having computer-executable instructions, which are executed by at least one processor to perform:
    (a) receiving a request to create a file, the request including data corresponding to a filename and a target directory;
    (b) setting the target directory as a current directory;
    (c) determining that the current directory is not associated with either a first set of data corresponding to a first set of policy, or a second set of data corresponding to a second set of policy, wherein each set of data corresponds to a set of one or more patterns;
    (d) in response to determining step (c), determining that the current directory has a parent directory and changing the current directory to the parent directory;
    (e) determining that the current directory that was changed to the parent directory in step (d) is associated with at least the first set of data corresponding to the first set of policy;
    (f) determining that the filename is a member of the first set of data by comparing the filename to a pattern corresponding to the first set of data;
    (g) applying the first set of policy; and
    (h) exiting, wherein the current directory that was changed to the parent directory in step (d) is also associated with the second set of data corresponding to the second set of policy, the filename is a member of the second set of data, and the step of exiting comprises exiting without applying the second set of policy.

2. The computer storage medium of claim 1 wherein the first set of data comprises an allow file group containing a set of at least one file group, and wherein determining that the filename is a member of the first set of data comprises determining that the filename is a member of any file group of the set of the at least one file group.

3. The computer storage medium of claim 2 wherein determining that the filename is a member of any file group of the set of the at least one file group comprises:
    evaluating whether the filename matches any non-member pattern in any file group, and if the filename does not match any non-member pattern in any file group, evaluating whether the filename matches any member pattern in any file group, and if so,
    determining that the filename is a member of at least one file group.

4. The computer storage medium of claim 1 wherein applying the first set of policy comprises allowing the request to create the file.

5. The computer storage medium of claim 1 wherein determining that the current directory is not associated with either a first set of data corresponding to a first set of policy, or a second set of data corresponding to a second set of policy, comprises determining that a directory screening object containing a reference to at least one file group is not associated with the current directory.

6. A method for applying policy to a request to create a file, the method comprising:
    (a) receiving, in a computer system, a request to create a file, the request including data corresponding to a filename and a target directory;
    (b) setting the target directory of the computer system as a current directory;
    (c) determining by the computer system that the current directory is not associated with either a first set of data corresponding to a first set of policy, or a second set of data corresponding to a second set of policy, wherein each set of data corresponds to a set of one or more patterns;
    (d) in response to determining step (c), determining by the computer system that the current directory has a parent directory in the computer system and changing the current directory to the parent directory;
    (e) determining by the computer system that the current directory that was changed to the parent directory in step (d) is associated with at least the first set of data corresponding to the first set of policy;
    (f) determining by the computer system that the filename is a member of the first set of data by comparing the filename to a pattern corresponding to the first set of data;
    (g) applying by the computer system the first set of policy; and
    (h) exiting by the computer system, wherein the current directory that was changed to the parent directory in step (d) is also associated with the second set of data corresponding to the second set of policy, the filename is a member of the second set of data, and the step of exiting comprises exiting without applying the second set of policy.

7. The method of claim 6 wherein determining that the current directory is not associated with either a first set of data corresponding to a first set of policy, or a second set of data corresponding to a second set of policy, comprises determining that a directory screening object containing a reference to at least one file group is not associated with the current directory.

8. The method of claim 6 wherein the first set of data comprises an allow file group containing a set of at least one file group, and wherein determining that the filename is a member of the first set of data comprises determining that the filename is a member of any file group of the set of at least the one file group.

9. The method of claim 8, wherein determining that the filename is a member of any file group of the set of the one file group comprises:
    evaluating whether the filename matches any non-member pattern in any file group, and if the filename does not match any non-member pattern in any file group, evaluating whether the filename matches any member pattern in any file group, and if so,
    determining that the filename is a member of at least one file group.

10. The method of claim 6, wherein applying the first set of policy comprises allowing the request to create the file.

11. A system for applying a set of policy to a request to create a file, comprising:
    a processor;
    a memory, communicatively coupled to the processor, containing instructions that are executed by the processor to perform:
    (a) receiving a request to create a file, the request including data corresponding to a filename and a target directory;
    (b) setting the target directory as a current directory;
    (c) determining that the current directory is not associated with either a first set of data corresponding to a first set of policy, or a second set of data corresponding to a second set of policy, wherein each set of data corresponds to a set of one or more patterns;

(d) in response to determining step (c), determining that the current directory has a parent directory and changing the current directory to the parent directory;

(e) determining that the current directory that was changed to the parent directory in step (d) is associated with at least the first set of data corresponding to the first set of policy;

(f) determining that the filename is a member of the first set of data by comparing the filename to a pattern corresponding to the first set of data;

(g) applying the first set of policy; and (h) exiting, wherein the current directory that was changed to the parent directory in step (d) is also associated with the second set of data corresponding to the second set of policy, the filename is a member of the second set of data, and the step of exiting comprises exiting without applying the second set of policy.

12. The system of claim 11 wherein determining that the current directory is not associated with either a first set of data corresponding to a first set of policy, or a second set of data corresponding to a second set of policy, comprises determining that a directory screening object containing a reference to at least one file group is not associated with the current directory.

13. The system of claim 11 wherein the first set of data comprises an allow file group containing a set of at least one file group, and wherein determining that the filename is a member of the first set of data comprises determining that the filename is a member of any file group of the set of the at least one file group.

14. The system of claim 13 wherein determining that the filename is a member of any file group of the set of the at least one file group comprises:

evaluating whether the filename matches any non-member pattern in any file group, and if the filename does not match any non-member pattern in any file group, evaluating whether the filename matches any member pattern in any file group, and if so, determining that the filename is a member of at least one file group.

15. The system of claim 11 wherein applying the first set of policy comprises allowing the request to create the file.

* * * * *